April 24, 1934.   A. C. KELLER   1,955,812
ELECTRIC METER
Filed Jan. 23, 1932
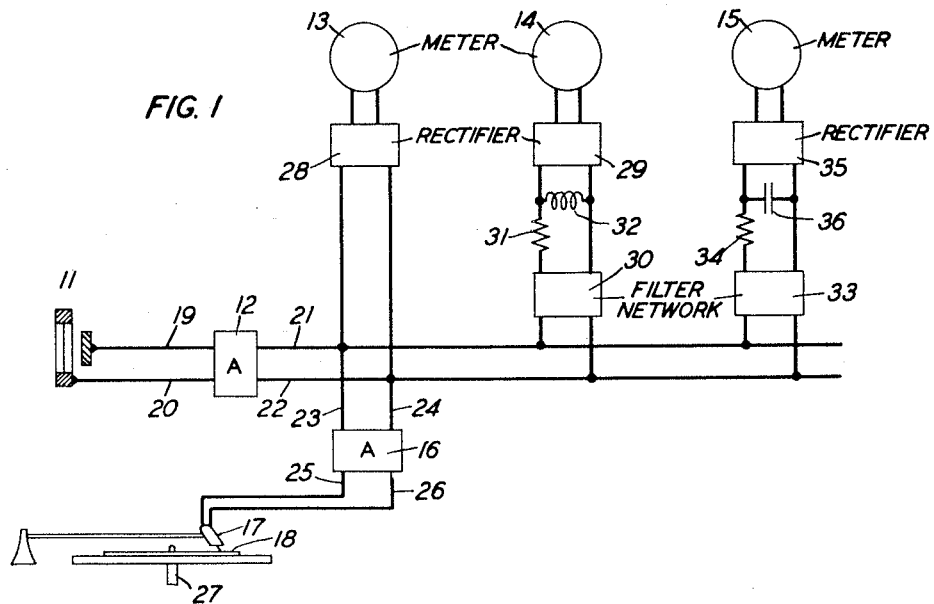
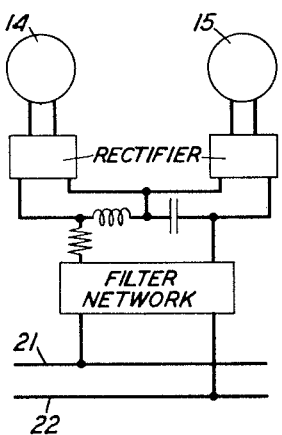
INVENTOR
A. C. KELLER
BY
ATTORNEY Patented Apr. 24, 1934

1,955,812

UNITED STATES PATENT OFFICE 1,955,812

ELECTRIC METER

Arthur C. Keller, Mount Vernon, N. Y., assignor to Bell Telephone Laboratories, Incorporated, New York, N. Y., a corporation of New York Application January 23, 1932, Serial No. 588,328

7 Claims. (Cl. 179—100.4)

This invention relates to sound recording systems and more particularly to devices for indicating the performance of a recorder while it is making a record.

It is well understood in the art of recording that the energy level of the input to the recorder must be maintained within certain predetermined limits in order to obtain a record which can be reproduced without excessive distortion. The general practice heretofore has been to connect a volume indicating device across the circuit leading to the recorder. This device usually comprises a thermionic rectifier and a moving coil galvanometer operated by the output of the rectifier. The maximum indication within the limits of successful recording is determined by experiment and the gain of the amplifying system is then controlled during recording to keep the input to the recorder within this limit. With this procedure, however, applicant has found that very frequently satisfactory and unsatisfactory records are obtained under apparently similar conditions which suggests that such an indicator does not always register the function which determines the quality of the record.

With recorders of the type generally used for phonograph recording the stylus point vibrates over a considerable portion of the frequency range with a vibrational velocity which is proportional to the voltage applied to the recorder and since indicators of the type referred to are operated by this voltage, the indication is a measure of the stylus vibratory velocity. With a given speed of rotation of the record blank being cut and at a given record radius, this velocity is a measure of the slope or steepness of the undulations of the record groove. This slope must, of course, be kept within the limits of the tracking ability of the reproducing devices and in the case of a hill and dale system it must also be such that the trailing edge of the cutting stylus clears the portion of the groove already cut.

Another requirement, which is generally understood, is that the amplitude of the recorder stylus vibrations must be kept within the limits of the groove spacing in a lateral system and within the average depth of cut in a lateral system so that "overcutting" in one case and "cutting out" in the other is avoided. These latter defects are often discovered only by inspection after the record has been made in which case the work must be repeated at some arbitrarily chosen, lower recording level which it is estimated will be within the limits of the record, but, as pointed out above, even when these conditions are satisfied, unsatisfactory results are frequently obtained.

Applicant attributes these poor results to another factor not ordinarily considered, namely, the minimum permissible radius of curvature of the groove undulations which can be successfully followed by the reproducing stylus. While the exact minimum value of this factor has not been definitely determined it is probably not materially different from the radius of the reproducing stylus point. Now, as will be more fully explained below, the minimum radius of curvature of a record groove is proportional to the corresponding instantaneous acceleration of the recording stylus. The acceleration is simply the rate of change, or derivative, of the velocity (which is indicated by the usual volume indicator) and the velocity is the rate of change or derivative of the amplitude of the stylus vibration or of the groove being cut.

The object of the present invention is to overcome the difficulties now encountered in setting the recording level and to provide indicating devices of such a nature that the recorder may be operated at the maximum level in each case consistent with obtaining satisfactory results.

In accordance with the general features of the invention the limiting factors which determine the maximum permissible recording level are determined for the particular selection to be recorded and the particular system to be used. Indicators are provided which are energized by potentials, which are derived from the currents representing the sounds to be recorded in such a manner that they vary in accordance with the functions of the currents corresponding to these limiting factors. The maximum indications so obtained are then used as a guide in setting the recording level.

As applied to phonograph recording, the system is provided with a device which indicates the instantaneous radius of curvature of the groove being cut and, this being dependent to some extent on the volume level at which the system is operating, the attendant may, by observing this device, adjust the level to the proper value as determined by the minimum radius of curvature requirement. One convenient way of causing the device to function in this manner is to bridge the circuit leading to the recorder with a high resistance in series with an inductance and to operate the device from the voltage derived from the inductance.

A further application of the invention to phonograph recording is an indicator adapted to register the instantaneous amplitude of vibration during the recording process. This may be effected by bridging a second high resistance and a condenser of the proper size across the circuit and operating a second indicator from the voltage derived from the condenser or by connecting the condenser in series with the resistance and inductance of the curvature circuit and operating the second indicator from the condenser voltage.

The invention will be more clearly understood from the following detailed specification and the accompanying drawing in which:

Fig. 1 is a circuit of a recording system including the meters of this invention; and Fig. 2 shows an alternative circuit for connecting the meters.

While in a sound recording system the motion of the recorder stylus usually represents a complex wave form embracing a large number of frequencies, the underlying principles of the invention can be more readily explained on the basis of a single sinusoidal frequency applied to the recorder. Under this condition the instantaneous amplitude of the stylus vibration may be expressed as $$a = A \sin \omega t \quad (1)$$

where A is the maximum amplitude for any given applied voltage.

The instantaneous velocity will be $$v = \frac{da}{dt} = A\omega \cos \omega t \quad (2)$$

where $A\omega$ is the maximum velocity.

The instantaneous acceleration will be $$\alpha = \frac{d^2a}{dt^2} = -A\omega^2 \sin \omega t \quad (3)$$

where $A\omega^2$ is the maximum acceleration.

The general expression for the radius of curvature of a wave form is $$\rho = \frac{1}{K} = \frac{(1+(Y')^2)^{\frac{3}{2}}}{Y''} \quad (4)$$

where K is the curvature $$Y' = \frac{dy}{dx}$$

and $$Y'' = \frac{d^2y}{dx^2}.$$

Any single frequency wave form may be expressed as $$Y = A_0 + A_2 \sin mx \quad (5)$$

then $$Y' = A_2 m \cos mx \quad (6)$$

and $$Y'' = -A_2 m^2 \sin mx \quad (7)$$

Substituting these values of Y' and Y'' in (4) above $$\rho = \frac{(1+A_2^2 m^2 \cos^2 mx)^{\frac{3}{2}}}{-A_2 m^2 \sin mx}. \quad (8)$$

Differentiating this expression for the minimum value of $$\rho min = \frac{1}{-A_2 m^2} \quad (9)$$

For a wave form cut in a disc record $$m = \frac{60 f}{BR'} \quad (10)$$

where $f$ is the frequency of the wave form, B is the turntable speed in R. P. M. and R' is the radius in inches of the particular groove under consideration. Since these factors are all constants in a given case $$m = cf \quad (11)$$

where c is a constant.

Referring back to Equation (3) it will be seen that the maximum acceleration of the stylus is $A\omega^2$ where, $\omega = 2\pi f$, and since the minimum radius of curvature is also directly dependent on the frequency, an indication of the acceleration of the stylus point is also a measure of the curvature of the groove undulations being cut.

The recording system of Fig. 1 comprises a source 11 of currents representing sounds to be recorded, an amplifier 12 indicating devices or meters 13, 14 and 15 with their associated apparatus, a second amplifier 16 and a recorder 17 cooperating with a record blank 18. The source 11 may be a pick-up transmitter or other translating device or it may be merely a connection to a communication system or other circuit carrying currents which are to be recorded. In any case the source is associated with the input circuit of amplifier 12 by conductors 19, and 20 and the output of the amplifier is conveyed by conductors 21, 22 and 23, 24 to amplifier 16 and from the amplifier to the recorder 17 by conductors 25, 26. The recorder 17 is shown cooperating with a disc record blank 18 on a rotating turntable 27, but it will be understood that the invention is independent of the particular type of recording system used. That is to say, it may be of either the lateral or vertical cut, disc or cylinder type or of the type in which a sound record is made mechanically on a moving strip, such as a moving picture film.

The indicating device 13 with its associated rectifier 28 comprises the usual volume indicator as shown for example in Patent 1,562,844 to O'Neill, November 24, 1925. This device is commonly used in setting recording levels, but as pointed out above the deflection so obtained is an indication of the vibratory velocity of the stylus. It will be understood, of course, that the accuracy of any of the indicators of this invention is dependent on the uniformity of the response of the recorder at the various frequencies within the range of interest. The efficiency of many recorders varies considerably with frequency and it is common practice to design them with a drooping characteristic at low frequencies to avoid over-cutting. Hence to obtain best results an equalizing network of the general type disclosed in Patent 1,453,980 to Hoyt May 1, 1923, or its equivalent should be used to compensate for the variations in efficiency with frequency. The meter 14 for indicating curvature and the associated rectifier 29 are identical with the corresponding elements of the volume indicator already described except that the meter 14 may be calibrated in suitable units of curvature. It will be noted, however, that in this case an equalizing network 30 and a very high resistance 31 are interposed between the rectifier and the recording circuit and that the rectifier is energized by the voltages impressed on the inductance 32, the impedance of which is very much less than that of resistance 31. The voltage across the inductance will therefore lag substantially 90° behind the voltage in the recorder circuit or in other words, it will be the derivative of that voltage.

It has already been shown that the stylus velocity is proportional to the recorder circuit voltage and that the stylus acceleration, which is a measure of the curvature under any given conditions, is proportional to the derivative of that voltage. Hence meter 14 connected as shown will register the instantaneous curvature of the groove being cut.

The meter 15 for indicating the amplitude of the stylus vibrations or the amplitude of the groove being cut is also similar to meter 13. It has an equalizing network 33, a very high resistance 34 and the voltage applied to its rectifier 35 is derived from the condenser 36 which is of low impedance compared to resistance 34. This voltage will be substantially 90° leading with respect to the voltage applied to the recorder and hence the meter 15 will indicate the integral of that voltage or the integral of the instantaneous stylus velocity which is the instantaneous amplitude.

An alternate circuit arrangement for the meters 14 and 15 is shown in Fig. 2. A single network 36 and a single resistance 37 serve both meters and the inductance 32 and the condenser 36 are connected in series as shown. The rectifiers 28 and 29 derive their voltages from the inductance and the condenser respectively so that the meters function as in the circuit of Fig. 1.

The necessity for using equalizers can be avoided if desired by deriving the voltages directly from the recording device itself. For instance, the recorder stylus arm may carry a small monitoring coil which vibrates, in a magnetic field provided for the purpose, to generate a voltage which is suitably amplified and applied to the resistance-inductance and the resistance-capacity elements to operate the meters 14 and 15.

It will be understood of course that while meters have been shown for indicating velocity, curvature and amplitude, one or more of these may not be required in a given system depending upon the nature of the sounds being recorded.

The invention has been explained with particular reference to phonograph recording but the general principles involved are applicable to various other systems. For example, in a film recording system using a light valve recorder of the type disclosed in Patent 1,638,555 to Wente August 9, 1927 the conventional volume indicator shows the instantaneous amplitude of the vibrations of the valve ribbons. It is well understood in the art, however, that if the ribbon velocity approaches that of the film moving past the valve serious distortion is introduced. Such distortion does not necessarily occur at maximum amplitudes hence a velocity indicator would be very useful in setting the recording level within the limits of permissible distortion. Since velocity is the derivative of amplitude, such a velocity indicator for this system must read the derivative of the ordinary volume indicator reading. It has been shown above that meter 14 indicates this function, hence the meter which indicates curvature for a phonograph system may be used without change to indicate ribbon velocity in a film system.

Other applications and modifications of the invention will occur to those skilled in the art and the invention should therefore be limited only by the following claims.

What is claimed is

1. The method of determining the maximum permissible recording level at which a phonograph record of a given selection can be made which comprises subjecting the recorder to currents representing the sounds to be recorded, deriving from the currents, potentials which vary with the instantaneous amplitude and acceleration of the recorder stylus and varying the strength of the currents to limit the potentials to predetermined values within the limits of successful recording.

2. In a transmission system, the combination with a source of currents representing sounds, a translating device and an electrical circuit between the source and the device, of means connected to the circuit for obtaining therefrom an alternating voltage in phase quadrature with respect to the voltage of the circuit and an indicating device operated by the alternating voltage.

3. In a transmission system, the combination with a source of currents representing sound, an electro-mechanical translating device and an electrical circuit between the source and the device, of a high resistance element and a reactance element in series across the circuit and an indicating device connected across the reactance element.

4. In a transmission system, the combination with a source of current representing sound, an electro-mechanical translating device and an electrical circuit between the source and the device, of a high resistance and an inductance in series across the circuit and an indicating device connected across the inductance.

5. In a transmission system, the combination with a source of currents representing sound, an electro-mechanical translating device and an electrical circuit between the source and the device, of a high resistance and a condenser in series across the circuit and an indicating device connected across the condenser.

6. In a recording system, the combination with a source of currents representing sounds to be recorded, a moving record blank and a recording device operated by the currents and having a stylus for forming an undulatory groove in the record blank, of means for indicating a desired physical characteristic of the groove comprising a high resistance and a reactance element electrically associated with the recorder to obtain a potential proportional to the desired characteristic of the groove and an indicator operated by said potential.

7. In a recording system, the combination with a source of currents representing sounds to be recorded, a moving record blank and a recording device operated by the currents and having a stylus for forming an undulatory groove in the record blank, of means for indicating the instantaneous curvature of the groove comprising an element electrically associated with the recorder to obtain a potential proportional to the acceleration of the stylus and an indicator operated by said potential.

ARTHUR C. KELLER.